(12) United States Patent
Navarro et al.

(10) Patent No.: US 10,834,229 B2
(45) Date of Patent: Nov. 10, 2020

(54) SCHEDULE CREATOR FOR DIGITAL MEDIA AND MULTIMEDIA SCHEDULING AND DELIVERY PLATFORM

(71) Applicants: Ronaldo Cordero Navarro, Hacienda Heights, CA (US); Jocelyn Co, Chino, CA (US)

(72) Inventors: Ronaldo Cordero Navarro, Hacienda Heights, CA (US); Jocelyn Co, Chino, CA (US)

( * ) Notice: Subject to any disclaimer, the term of this patent is extended or adjusted under 35 U.S.C. 154(b) by 0 days.

(21) Appl. No.: 16/661,966

(22) Filed: Oct. 23, 2019

(65) Prior Publication Data
US 2020/0059535 A1 Feb. 20, 2020

Related U.S. Application Data

(62) Division of application No. 15/924,159, filed on Mar. 16, 2018, now Pat. No. 10,609,178.

(51) Int. Cl.
*H04L 29/08* (2006.01)
*H04L 29/06* (2006.01)

(52) U.S. Cl.
CPC .......... *H04L 67/32* (2013.01); *H04L 65/4084* (2013.01); *H04L 65/607* (2013.01); *H04L 67/306* (2013.01); *H04L 67/325* (2013.01); *H04L 67/34* (2013.01)

(58) Field of Classification Search
None
See application file for complete search history.

(56) References Cited

U.S. PATENT DOCUMENTS

| 2010/0169454 A1* | 7/2010 | Tanimura | G06F 16/40 709/217 |
| 2015/0156174 A1* | 6/2015 | Fahey | H04L 63/0428 713/168 |
| 2016/0092111 A1* | 3/2016 | Ren | G06F 3/0611 711/162 |
| 2017/0006314 A1* | 1/2017 | Danovitz | H04N 21/2747 |

* cited by examiner

*Primary Examiner* — Cai Y Chen

(57) ABSTRACT

The system is a self-serve platform, which delivers user uploaded media and multimedia files, of varying playback duration, to a client computer connected to a digital display; which is set to receive executions for a scheduled playlist and punctually presents the playback of media and/or multimedia files in said playlist record. The system's included functions for schedule generation, schedule selection, and playlist creation contain unique, and embedded automatic functions, provide the capacity for making scheduling and delivery of media and multimedia files reliable, accessible, and cost efficient.

3 Claims, 2 Drawing Sheets

SCHEDULE CREATOR FOR DIGITAL MEDIA AND MULTIMEDIA SCHEDULING AND DELIVERY PLATFORM

CROSS REFERENCE TO RELATED APPLICATIONS

This application, which discloses and claims only subject matter disclosed in prior application Ser. No. 15/924,159, filed on Mar. 16, 2018 that claims the benefit of U.S. Provisional Application No. 62/472,049, filed on Mar. 16, 2017, appears to claim only subject matter directed to an invention that is independent and distinct from that claimed in the prior application Ser. No. 15/924,159, and names the inventor or at least one joint inventor named in the prior application. Accordingly, this application may constitute a divisional application. Should applicant desire to claim the benefit of the filing date of the prior application, attention is directed to 35 U.S.C. 120, 37 CFR 1.78, and MPEP § 211 et seq.

BACKGROUND

Field of Invention

The disclosure generally relates to the field of media and multimedia presentation and distribution systems, and more specifically, to creating a system with autonomous components to schedule and present media and multimedia of varying duration.

Description of Related Art

Out-of-home advertising, OOH, incorporates a variety of different means to present advertisements and create brand recognition, specifically, as relating to the art, in the form of static images, digital presentation of static images with set durations or exposure times, and more sophisticated digital presentation of video media. The widespread practice of using posters and billboards for advertising has slowly evolved to incorporate the use of more dynamic digital systems. These systems may feature engaging visual effects via digital signage such a digital posters, digital billboards, and even small digital displays.

While digital signage is more engaging and certain companies do offer viable means for private individuals and businesses to advertise digitally, these companies share common disadvantages that are unfortunately passed along to the advertiser. Many of these companies require time consuming and out-of-date practices, including: require person to person dialogue and correspondence to figure out scheduling, require expensive investments such as large digital billboards which limits overall scalability reach, place large restrictions on the file types accepted, enforce unfair bidding systems that limit accessibility to many due to the very expensive and obscure rates, and lack automation and novelty that can lower rates and improve accessibility.

In general, the current state of the art lacks sophisticated automation processes that would improve accessibility, lacks a structure that can provide transparent scheduling with pricing, lacks a signage system that accept submittal of various media and multimedia file types of varying duration, and lacks a sustainable growth model due to the large capital investments required on businesses that rely on digital billboards.

BRIEF SUMMARY OF THE INVENTION

To address the disadvantages of current digital signage systems involved with digital advertisement placements, the system offers an accessible internet platform that allows users to simply create an account, upload their media or multimedia file(s), advertisement(s), or announcement(s), and individually schedule said file or files for playback on a digital display or selection of digital displays, available in client network. With this type of system, various file formats are accepted and, due to the encoding process, will allow users to upload image and video files alike, and schedule them for punctual presentation on selected digital displays. The system does not incorporate a bidding system and, due to the automated nature, will have low running costs to operate, passing along the savings to the advertisers. Scalability costs will also be low for the system due to majority of the digital displays available in the client network are planned to be small displays for mainly indoor with some outdoor use.

DETAILED DESCRIPTION

Figure 1A:
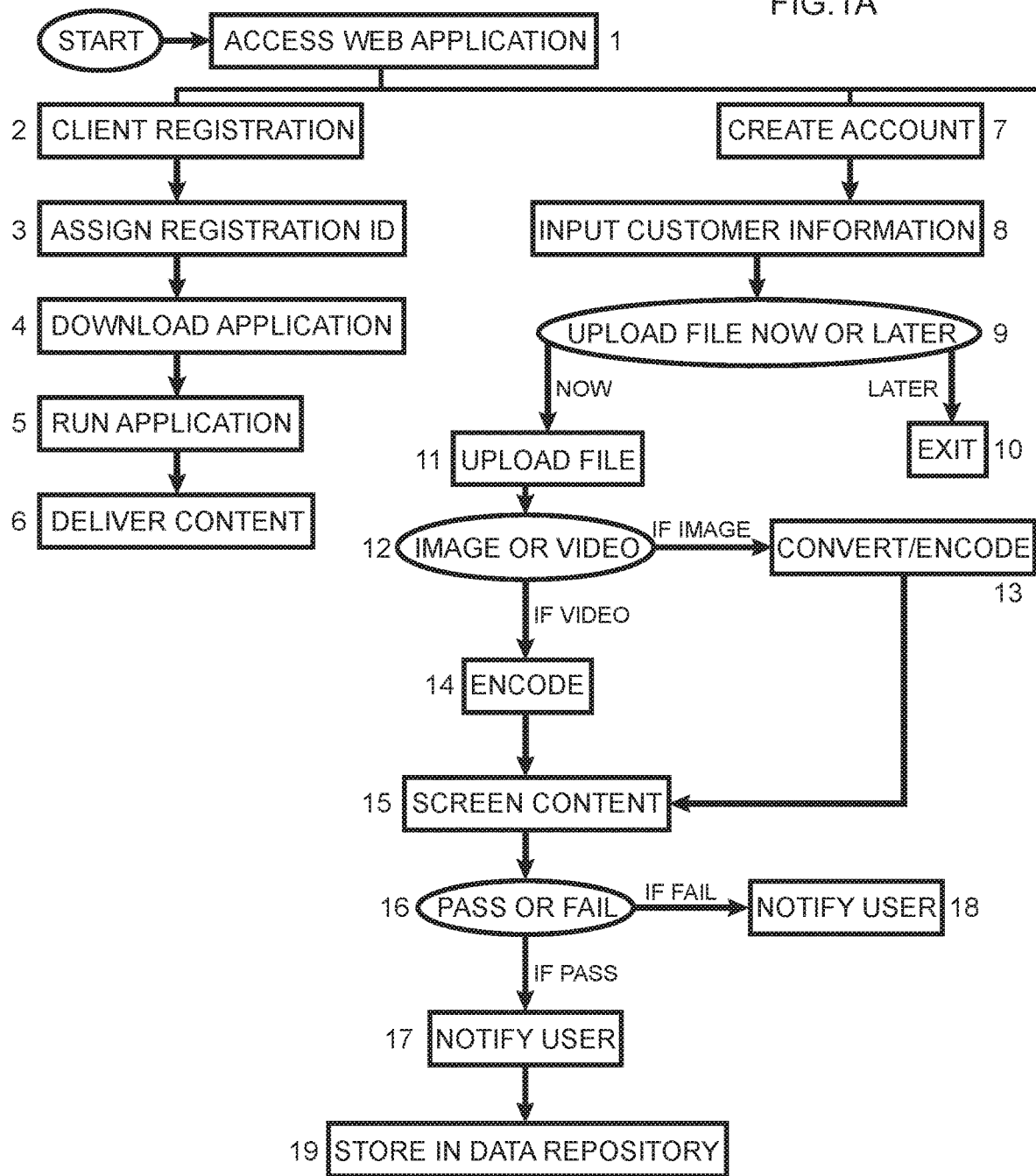
FIG. 1A depicts a partial view of one embodiment of the system in which two out of three main modules, CLIENT REGISTRATION and CREATE ACCOUNT, are illustrated.

The system includes a CLIENT REGISTRATION module 2, that allows a windows-based client computer, connected to an external digital display or a series of digital displays (that produce a scaled display), to establish connection to the server. The system creates a unique registration ID number illustrated in submodule ASSIGN REGISTRATION ID 3, for the respective client computer and stores this unique identifier in a database. The operator of the respective client computer is prompted to download the client application 4 through the website. Upon installation of the client application, the application runs 5, and the client computer's registration ID is verified to establish initial connection with the server. Upon successful registration, the server delivers pre-prepared filler files 6 (of media and multimedia content) to a designated storage in the client computer. This enables the client computer to commence display of respective filler files, pending playlist orders from scheduled media and multimedia files from respective user or users.

The system further incudes a CREATE ACCOUNT module 7, that allows any user to create an account, which enables the user to upload and schedule their respective media and/or multimedia file for playback on registered client digital displays. After submission of pertinent user account information 8, such as email address, business name, business address, and phone number, the user's account is activated, and the user is prompted to either upload their media and/or multimedia file(s) to continue the session, or they can choose to upload at a later time 9. If the user decides to upload their media and/or multimedia file(s) at a 'later time, the user can end the session 10. If the user chooses to upload their media and/or multimedia file(s) 11, the user is prompted to select between uploading an image or a video 12.

If the user selects to upload an image file 13, the user is prompted to assign a desired playback duration for said file. The system encodes said image file into a video file, in MP4 format with the H.264 codec, that has attributed playback duration that the user assigned in previous step. If the user selects to upload a video file, the system encodes said video file with its respective file property attributed duration, in MP4 format with the H.264 codec. The duration info, along with other pertinent data of the encoded file is written to a record in a designated data file on the server. The respective video file is stored in a separate storage on the server.

An additional process involved with the ENCODE submodule 14 is an edit process that truncates a temporal length that equates to the transition time that is imposed by media player between playback of scheduled files. This process is necessary for maintaining scheduled start times in a punctual manner and maintains schedule integrity of respective playlists executed by the client application.

The system then moves the encoded file to a data file folder intended for access by the screening process 15, wherein the encoded files are accessed for manual screening through a server application. Screening is based on a video file content's subject matter, any resulting technical issues during encoding, and accurate metadata; and is approved or denied based on internal protocols. Each encoded file is assigned a pass or fail classification 16. The user is then notified of respective statutes by email and/or SMS 17 and 18, respectively. A pass classification allows the user to proceed to schedule the respective media or multimedia file. A fail classification denotes an end to the cycle for that respective file. The file is then stored 19 in a specific data file folder in the server's data repository, which contains copies of all screened files regardless of respective status.

Figure 1B:
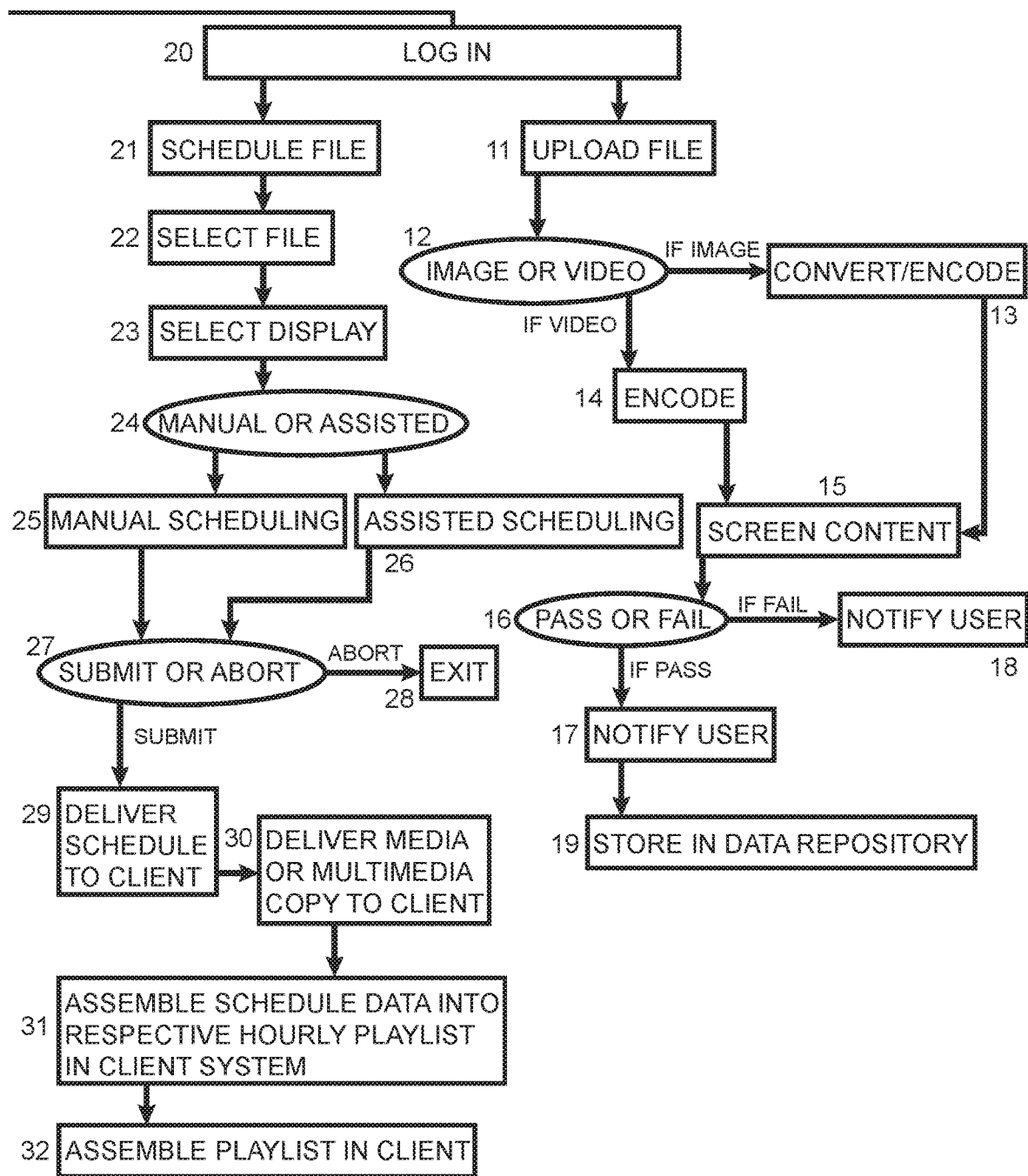
FIG. 1B depicts the accompanying partial view of the same embodiment of the system in which the third main module, LOG IN, is illustrated.

FIG. 1B depicts the third main module involving the LOG IN procedure 20. It also includes submodules 11-19, which are the same ones found in FIG. 1A and which were described in paragraphs [0009] to [0012]. One of its submodules, SCHEDULE FILE, 21 is further described below.

Upon user selection of their respective media or multimedia file, illustrated in submodule SCHEDULE FILE 21, if said user only has one media or multimedia file attributed to their respective account, the system pre-selects 22 said user's media or multimedia file; and is then prompted to select the target digital display, wherein respective client application is connected. If said user has more than one media and/or multimedia file attributed to their respective account, the system provides a drop-down list of said user's media and/or multimedia files available for selection 22.

Said user is then prompted to select the digital display 23 to which the user wishes to schedule playback of their selected media or multimedia file. The availability of digital displays is subject to the user's media or multimedia file's conformity to respective display's requirements concerning: orientation and sizing of display's screen, content subject matter, and metadata accuracy.

Upon user's digital display selection, user is prompted to select 24 either a manual process of scheduling or an assisted process of scheduling their respective media or multimedia file. If manual scheduling 25 is selected, the system will prompt the user to select a calendar date, and upon selection of said calendar date, the system will display all available predefined time periods that contain available time slots, whereby each time slot has temporal length equal to user's media or multimedia file's playback duration. Additionally, the user would also have the option to enter a user-defined time period that would contain available time slots, whereby each time slot has temporal length equal to user's media or multimedia file's playback duration. The system will then display the available schedule items within each selected predefined, or assigned user-defined, time period.

If assisted scheduling 26 is opted for, the user will be prompted to enter a user-defined playback frequency and a user-defined time period, per selected date for user's media or multimedia file's playback. The system will generate a schedule of all possible schedule items, within applicable time period(s), wherein user's defined frequency criterion is met, per date selected.

The following description entails how the time slots, also referred to as schedule items, are configured and generated by the system. Schedule items hold scheduling positions in generated schedules, with each schedule item's temporal length being equal to each respective user media or multimedia file's duration. When assembled, these schedule items encompass the total available time in the generated schedule list, within a selected predefined, or assigned user defined time period, within the selected calendar date. They are generated by algorithmic loops that analyze previously scheduled records of user submitted media and/or multimedia file(s), per respective calendar date file, if said calendar date file exists. Any applicable predefined, or user defined, time period with no scheduled records is simply analyzed by, dividing the respective time period by the duration of said media or multimedia file, and creating a whole number of such schedule items that encompass the time beginning from the start of each applicable time period to the end or as close to the end of said time period. If previously scheduled records exist within said time period, the system analyzes: if there is a gap between the beginning of said time period and the beginning of the first scheduled record, if there is a gap between the first scheduled record and the following scheduled record, and so on until it analyzes if there is a gap between the end of the last scheduled record and the end of said time period; once these gaps are identified, the system creates a total number of schedule items equal to the number of gaps within said time period that are large enough, temporally, to fit said user media or multimedia file's duration.

Upon user submittal and confirmation 27, the server's calendar date, within its respective calendar month file, within its respective calendar year file, with respect to the scheduling data per user media or multimedia file, and the corresponding copies of each said calendar type files, located in the storage of the client computer, are updated 29 with said submitted schedule data and the respective media or multimedia file's metadata. If user cancels, the application will terminate the session 28.

Upon submittal and confirmation of schedule data transfer by the user, the system will also deliver a copy of said user's media or multimedia file 30 to respective client computer, if said client computer does not already contain said media or multimedia file in its storage.

Hourly playlists on client computer are assembled 31 every hour on the half hour. Playlists are displayed on respective client computer's digital display every hour on the hour. To assemble playlist, the system routinely scans daily calendar files on an hourly basis and incorporates procedures that assemble records pertinent to next playlist in chronological order. During assembly of the playlist 32, time gaps are identified, which may lie between a multitude of the following positions: between the beginning of the hour playlist and the beginning of the first scheduled record for that hour, between the end of the first scheduled record and the beginning of the next scheduled record, between a number of records in the middle section of the hour, between the end of the second to last scheduled record and the beginning of the last scheduled record, or between the end of the last scheduled record and the end of the hour playlist. With the gaps identified, the playlist assembles, and these gaps are matched with media and/or multimedia files found in a filler folder, which includes many such files of varying durations, and the process fills said gaps with said files, while attempting to use as many of the filler files as possible, limiting the reoccurrence of the same filler file in the playlist.

BEST MODE OF IMPLEMENTATION

1. Below are the recommended hardware requirements for the server:
   Intel i5 or i7 processor;
   RAID 1 compatible motherboard;
   Windows 8 or newer operating system;
   64 GB of RAM for Windows Server 2016 Essentials;
   2×500 GB RAID 1 for Operating System;
   1 TB for data back up
2. Below are the recommended hardware requirements for the client computer and user's computing device:
   Dual Core processor;
   2 GB of RAM;
   32-bit or 64-bit Operating System
3. Below are incorporated Open-source software required for the system to run precisely:
   1. FFMPEG, an Open-source code platform, which is integrated in the system for efficient handling and encoding of media and multimedia data.
      Files are encoded to MP4 format with the H.264 codec.
      FFMPEG is licensed under GNU Lesser General Public License (LGPL)
   2. MediaInfo 0.7.62, an Open-source program, which is integrated in the system to retrieve necessary metadata of media and multimedia files.
      MediaInfo 0.7.62 is licensed under GNU Lesser General Public License (LGPL)

What is claimed is:

1. A computer implemented method of generating a schedule intended to reserve time slots for punctual playback of user media and multimedia on a digital display available in client network, comprising:
   a process that generates a chronological schedule that is partitioned into selectable schedule items,
   where each item's temporal length is equal to a user's selected media or multimedia file's playback duration,
   in which the sum of generated schedule items encompasses the total time available per selected predefined, and/or assigned user-defined, time period,
   wherein the selected predefined time period is one of many predefined time periods per calendar date selected by said user, for each selected digital display available in client network;
   and a process that analyzes database records per selected digital display, per selected calendar date,
   per selected predefined time period,
   per assigned user-defined time period,
   in order to generate a schedule that which, at the time of execution, does not generate schedule items that would conflict temporally with said user's or another user's previously submitted scheduling.

2. A media and multimedia schedule generating system, intended to reserve time slots for punctual playback of user media and multimedia on a digital display available in client network,
   comprising:
      a computer processor, a routing engine executing on the computer processor and configured to:
      generate a chronological schedule that is partitioned into selectable schedule items,
      where each item's temporal length is equal to a user's selected media or multimedia file's playback duration,
      in which the sum of generated schedule items encompasses the total time available per selected predefined, and/or assigned user-defined, time period,
      wherein the selected predefined time period is one of many predefined time periods per calendar date selected by said user, for each selected digital display available in client network;
      and a process that analyzes database records per selected digital display, per selected calendar date, per selected predefined, and/or assigned user-defined, time period,
      in order to generate a schedule that which, at the time of execution, does not generate schedule items that would conflict temporally with said user's or another user's previously submitted scheduling.

3. A non-transitory computer readable medium comprising a plurality of instructions for generating a schedule for media and multimedia files, the plurality of instructions comprising functionality to:
   generate a chronological schedule that is partitioned into selectable schedule items,
   wherein each item's temporal length is equal to a user's selected media or multimedia file's playback duration,
   in which the sum of generated schedule items encompasses the total time available per selected predefined, and/or assigned user-defined, time period,
   wherein the selected predefined time period is one of many predefined time periods per calendar date selected by said user,
   for each selected digital display available in client network;
   and a process that analyzes database records per selected digital display, per selected calendar date, per selected predefined, and/or assigned user-defined, time period,
   in order to generate a schedule that which, at the time of execution, does not generate schedule items that would conflict temporally with said user's or another user's previously submitted scheduling.

* * * * *